United States Patent
Shimada et al.

(10) Patent No.: US 7,956,298 B2
(45) Date of Patent: Jun. 7, 2011

(54) INHIBITOR SWITCH FOR AUTOMATIC TRANSMISSION

(75) Inventors: Hiroyuki Shimada, Tokyo (JP); Takashi Horikoshi, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 394 days.

(21) Appl. No.: 12/230,653

(22) Filed: Sep. 3, 2008

(65) Prior Publication Data
US 2009/0065331 A1  Mar. 12, 2009

(30) Foreign Application Priority Data

Sep. 6, 2007 (JP) ................................ P2007-232007

(51) Int. Cl.
*H01H 19/00* (2006.01)
(52) U.S. Cl. ...................................... 200/6 R; 200/11 A
(58) Field of Classification Search .................. 200/6 R, 200/11 A, 571
See application file for complete search history.

(56) References Cited

U.S. PATENT DOCUMENTS

| 2,745,915 A | * | 5/1956 | Pantages ...................... 200/11 A |
| 5,736,701 A | | 4/1998 | O'Brien et al. |
| 5,743,380 A | * | 4/1998 | Gauker ...................... 200/43.08 |
| 5,977,496 A | * | 11/1999 | Halberg et al. ............ 200/61.88 |

\* cited by examiner

*Primary Examiner* — Renee S Luebke
*Assistant Examiner* — Lisa Klaus
(74) *Attorney, Agent, or Firm* — Rader, Fishman & Grauer PLLC

(57) ABSTRACT

A movable contact board is engaged to a detent plate and the movable contact board is provided with a plurality of support portions, for example, four legs for supporting a stationary contact board and, on the other hand, the stationary contact board is provided with a plurality of guide grooves for reciprocally guiding the four support portions (legs) in the movable contact board along the rotational direction. Further, the plurality of the support portions (leg) are configured of the support portions, for example, four legs extending generally vertically from the movable contact board so as to straddle stationary contact points and bending portions provided in the four respective legs to penetrate through the pair of the guide grooves in the stationary contact board for supporting the stationary contact board from the backside. Thereby, an inhibitor switch preferable in view of reduction in the number of components and reduction in a plastic amount can be provided.

2 Claims, 3 Drawing Sheets

INHIBITOR SWITCH FOR AUTOMATIC TRANSMISSION

CROSS-REFERENCE TO RELATED APPLICATION

This application claims priority under 35 USC 119 from Japanese Patent Application No. 2007-232007, the disclosure of which is incorporated by reference herein.

BACKGROUND OF THE INVENTION

1. Field of the invention

The present invention relates to an inhibitor switch for detecting a shift range point of an automatic transmission, and particularly to an inhibitor switch for an automatic transmission which contributes to reduction in the number of components and reduction in a plastic amount.

2. Description of Related Art

U.S. Pat. No. 5,736,701 conventionally proposes an inhibitor switch for detecting a select position of a shift range selector such as a selector lever in an automatic transmission in which a manual valve operates in accordance with the select position of the shift range selector, thereby switching a shift range point.

The inhibitor switch 101 in U.S. Pat. No. 5,736,701 is, as shown in FIG. 3, configured so that a metallic detent plate 103 moving depending on a select position of the select lever and an insulative, plastic stationary contact board 105 are arranged to be as opposed to each other while permitting relative rotation with each other around a manual shaft 107 which is a common shaft of the detent lever 103 and the contact board 105.

An insulative, plastic movable contact board 109 is attached to the detent plate 103. The movable contact board 109 is provided with a plurality of movable contact points 111. For attaching the movable contact board 109 to the detent plate 103, for example, four plastic boss portions 115 which are attached on the movable contact board 109 to extend vertically therefrom are fitted into, for example, four through bores 113 formed to penetrate through the detent plate 103, which are attached by fastening means such as heat caulking or press fitting.

On the other hand, in the stationary contact board 105, a plurality of stationary contact points 117 are provided on one side surface thereof facing the movable contact board 109 by, for example, insert molding.

In the inhibitor switch 101 as constructed above, the detent plate 103 is fixed and fastened to the manual shaft 107 and on the other hand, the stationary contact board 105 is fixed and fastened to a vehicle body side such as a transmission casing. Therefore, when the detent plate 103 rotates and moves with rotation of the manual shaft 107, the movable contact point 111 slides on the stationary contact point 117 while creating a predetermined contact pressure therebetween. By detecting a change of an electrical connection pattern in accordance with a sliding position of the movable contact point 111 to the stationary contact point 117 at this time, a rotational position or the like of the manual shaft 107 is detected and also the shift range position or the like is detected.

In the conventional inhibitor switch 101, however, the metallic detent plate 103 and the plastic stationary contact board 105 are constructed to be as opposed to each other as having a common shaft of both of the metallic detent plate 103 and the plastic stationary contact board 105 as a relative rotation center. Therefore, the stationary contact board 105 requires formation of the shaft support portion 106 and a component (nut) for supporting the stationary contact board 105 is required. In consequence, there is a high demand for an improvement on the inhibitor switch in view of reduction in the number of components and reduction in the plastic amount.

In view of the above, there exists a need for an inhibitor switch for an automatic transmission which overcomes the above mentioned problems in the conventional art. The present invention addresses this need in the conventional art as well as other needs, which will become apparent to those skilled in the art from this disclosure.

SUMMARY OF THE INVENTION

The present invention is made in view of the foregoing problems and it is an object of the present invention to provide an inhibitor switch for an automatic transmission which contributes to reduction in the number of components and reduction in a plastic amount.

According to an aspect of the present invention, an inhibitor switch for an automatic transmission is configured as follows. A metallic detent plate rotating with a shaft depending on a select position of a select lever for an automatic transmission and an insulative, plastic stationary contact board are arranged to be as opposed to each other. The stationary contact board is provided with metallic stationary contact points and on the other hand, the detent plate is engaged to an insulative, plastic movable contact board. The movable contact board is provided with metallic movable contact points at positions facing the stationary contact points to slide on the stationary contact points. By detecting a change of an electrical connection pattern in accordance with a sliding position of the movable contact point to the stationary contact point when the detent plate rotates with rotation of the shaft, a shift range position for the automatic transmission is detected. The movable contact board is provided with a plurality of support portions for supporting the stationary contact board and, on the other hand, the stationary contact board is provided with a plurality of guide grooves for reciprocally guiding the plurality of the support portions in the movable contact board along the rotational direction.

ADVANTAGE OF THE INVENTION

In the conventional inhibitor switch, the metallic detent plate and the plastic stationary contact board are constructed to be as opposed to each other as having a common shaft of both thereof as a relative rotation center. Therefore, the stationary contact board requires formation of the shaft support portion and the component for supporting the stationary contact board is required. In consequence, there is a high demand for an improvement on the inhibitor switch in view of reduction in the number of components and reduction in the plastic amount.

On the other hand, in the inhibitor switch for the automatic transmission according to the aspect of the present invention, the movable contact board is engaged to the detent plate and the movable contact board is provided with a plurality of support portions for supporting the stationary contact board and, on the other hand, the stationary contact board is provided with a plurality of guide grooves for reciprocally guiding the plurality of the support portions in the movable contact board along the rotational direction. Thereby, since the stationary contact board is supported through the movable contact board reciprocally guided along the rotational direction, formation of the shaft support portion to the stationary contact board is not required and the component for supporting the stationary contact board is not required, making it possible to acquire an inhibitor switch preferable in view of reduction in the number of components and reduction in a plastic amount.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE EXAMPLE EMBODIMENTS

Embodiment

Hereinafter, an inhibitor switch for an automatic transmission according to an embodiment of the present invention will be explained with reference to the drawings.

[Schematic Arrangement in the Circumference of an Inhibitor Switch for an Automatic Transmission]

Figure 1:
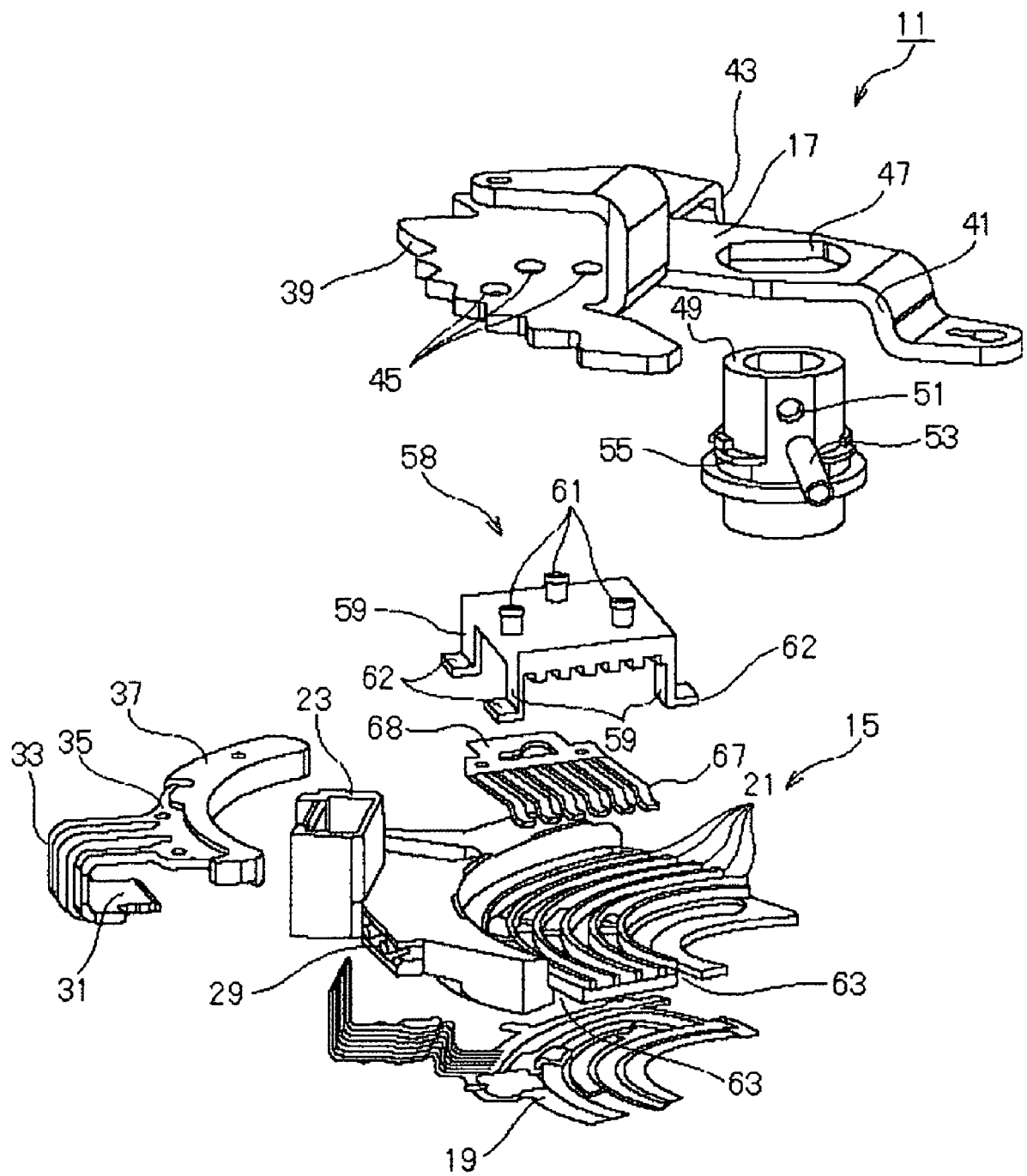
FIG. 1 is an exploded perspective view showing a schematic arrangement in an inhibitor switch for an automatic transmission in an embodiment of the present invention.
Figure 2:
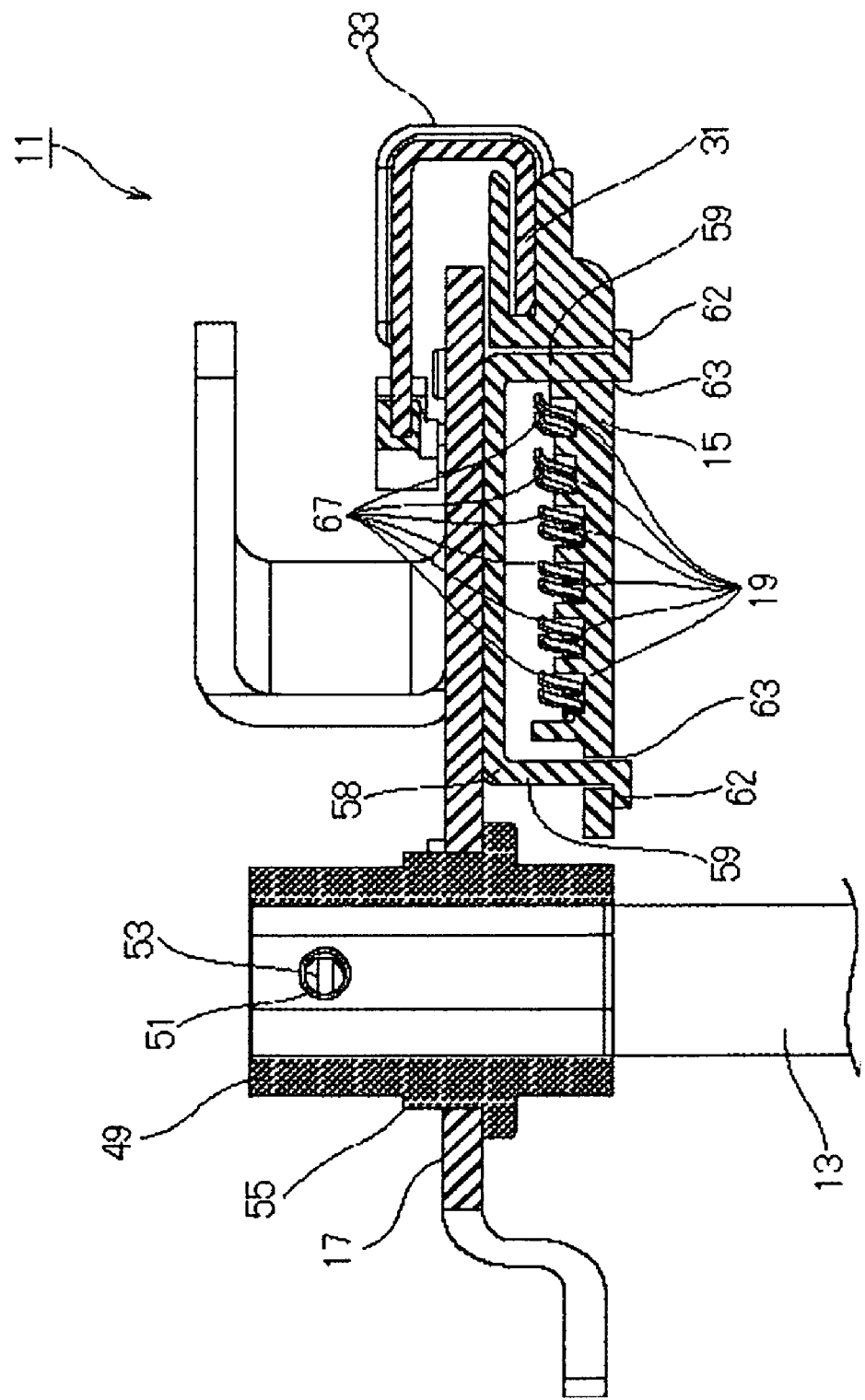
FIG. 2 is a partial cross section showing the inhibitor switch for the automatic transmission in the embodiment of the present invention.
Figure 3:
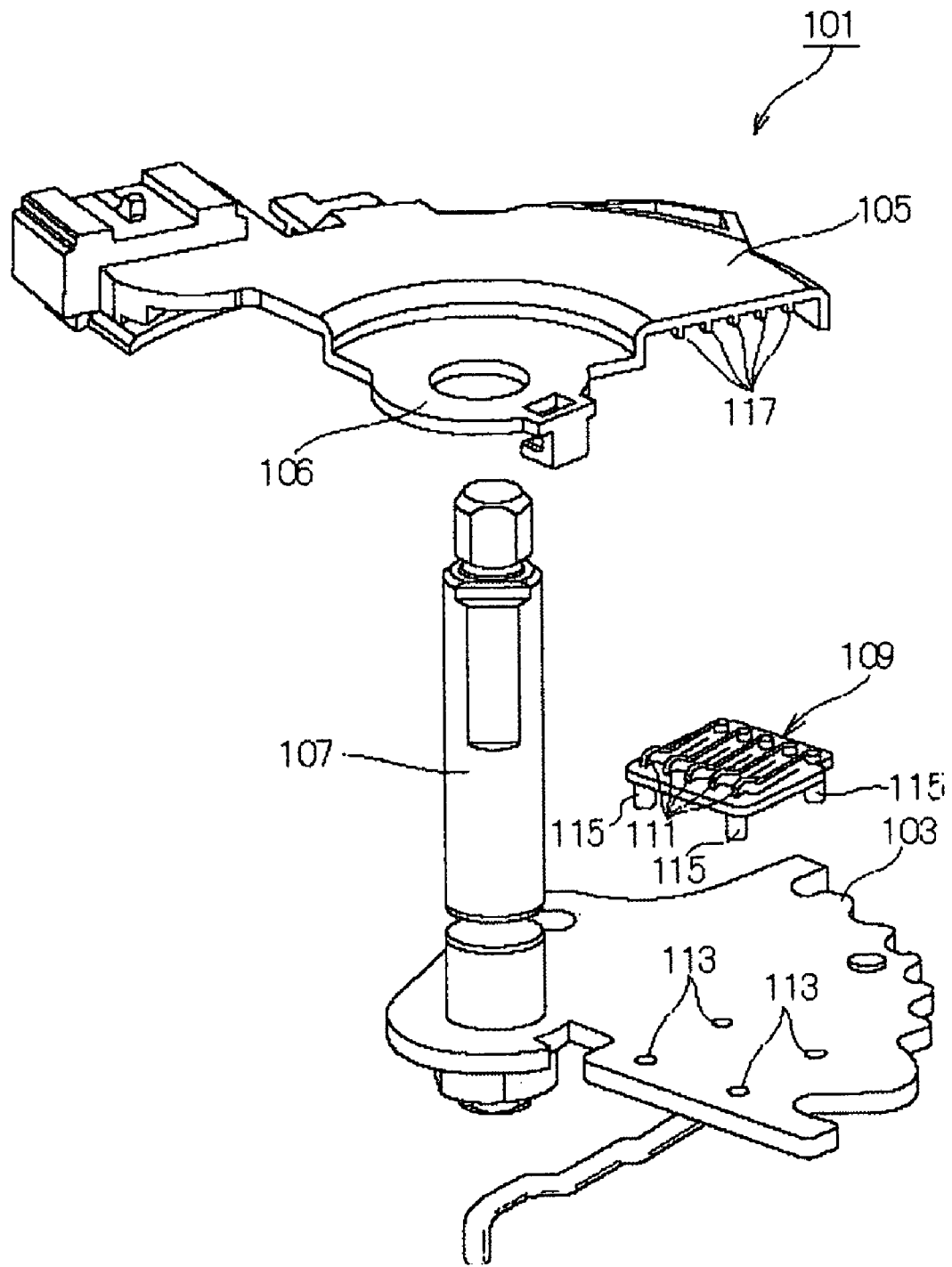
FIG. 3 is an exploded perspective view showing a schematic arrangement in an inhibitor switch for an automatic transmission in the conventional art.

FIG. 1 is an exploded perspective view showing a schematic arrangement in an inhibitor switch for an automatic transmission in an embodiment of the present invention and FIG. 2 is a partial cross section showing the inhibitor switch for the automatic transmission in the embodiment of the present invention. It should be noted that an illustration of a manual shaft is omitted in FIG. 1.

As shown in FIGS. 1 and 2, an inhibitor switch 11 is connected to a manual shaft 13 in a transmission casing (not shown). In detail, the inhibitor switch 11 is configured so that a metallic detent plate 17 rotating with a manual shaft depending on a select position of a select lever for an automatic transmission and an insulative, plastic stationary contact board 15 are provided to be as opposed to each other.

A plurality of metallic stationary contact points 19 are integrally formed to be arrayed in a generally fan-shape along a rotational direction of the detent plate 17 to the stationary contact board 15 by insert molding. In the same with the stationary contact board 15, a plurality of plastic ribs 21 formed to be arrayed in a generally fan-shape along the rotational direction are provided in the stationary contact board 15 to extend vertically therefrom. The ribs 21 are to guide movable contact points 67 provided in the movable contact board 58 along the rotational direction, which will be described later, and also prevent an electrical shortcut attributable to foreign matters such as dusts attached to the stationary contact points 19 adjacent to each other. The stationary contact board 15 is provided with a plurality of guide grooves 63 for reciprocally guiding a plurality of support portions 59 (leg portion) in the movable contact board 58 to be described later along the rotational direction. In the pair of the guide grooves 63, among a stationary contact point group 19, one of the pair is formed at furthermore inner side than the stationary contact point 19 at the most inner side and the other is formed at furthermore outer side than the stationary contact point 19 at the most outer side.

The stationary contact board 15 is provided with a connector 23 for electrical connection with an outside thereof. Further, a metallic guide member 33 is attached to the stationary contact board 15 as a result of inserting an insert portion 31 in the guide member 33 into an engaging portion 29 in the outer periphery of the stationary contact board 15. The guide member 33 has a folded portion 35 folded in a direction of the manual shaft 13, having a cross section formed in a generally C-letter shape. The folded portion 35 has a generally entire surface at an end of the folding side covered with a plastic cover 37. The plastic cover 37 is provided to cover one side surface of the detent plate 17.

The detent plate 17 serves to convey a detent feeling to a user at the time of switching the inhibitor switch 11. Therefore, the detent plate 17 is provided with a wave-shaped portion 39 in the outer periphery of the detent plate 17. When the roller spring (not shown) is engaged resiliently to the detent plate 17 while going over the wave-shaped portion 39, the detent feeling can be conveyed to a user at the time of switching. In the detent plate 17, by bending a part thereof generally vertically from one end surface, first and second regulation portions 41 and 43 are formed. The first and second regulation portions 41 and 43 serve to regulate turning of the detent plate 17 to the stationary contact board 15 within a detection region of an electrical connection pattern between the stationary contact point 19 and the movable contact point 62 to be described later due to a mechanical mutual function with the stationary contact board 15. The detent plate 17 is provided with three through bores 45 formed to penetrate therein for engaging to the movable contact board 58 to be described later. Further, the detent plate 17 is provided with a through bore 47 formed to penetrate therethrough for fastening and fixing the manual shaft 13 by appropriate means such as press-clamping or fixing.

For fastening and fixing the detent plate 17 to the manual shaft 13, for example, a plastic or metallic cylindrical member 49 surrounding the manual shaft 13 is engaged to the manual shaft 13. The cylindrical member 49 has a side wall provided with a through bore 51 formed to penetrate therethrough. For engaging the cylindrical member 49 to the manual shaft 13, at a state where the through bore 51 provided with the side wall of the cylindrical member 49 formed to penetrate therethrough and a through bore (not shown) provided with a side wall of the manual shaft 13 formed to penetrate therethrough are positioned to overlap with each other, a pin 53 is adapted to press-fit in the through bore 51. Further, the cylindrical member 49 is provided with an expanding portion 55 formed at the side wall thereof. The expanding portion 55 is press-fastened or fixed at a state of being inserted into the through bore 47 formed to penetrate through the detent plate 17, so that the detent plate 17 is fastened and fixed to the cylindrical member 49.

For detecting a rotational position of the detent plate 17 to the stationary contact board 15, the insulative, plastic movable contact board 58 is provided to engage to the detent plate 17. This engagement is realized by, for example, inserting the three boss portions 61 integral with the movable contact board 58 to extend vertically therefrom into the through bores 45 formed to penetrate through the detent plate 17 and thereafter, caulking or press-fitting thereof. A movable contact point unit 68 having a plurality of movable contact points 67 is attached to the movable contact board 58 at the base by appropriate means such as riveting, caulking, press-fitting or insert molding.

For suspending the stationary contact board 15, the movable contact board 58 is provided with a plurality of support portions 59. The plurality of the support portions 59 in the movable contact board 58 are engaged to the pair of the guide grooves 63 formed in the stationary contact board 15 to suspend the stationary contact board 15. Therefore, the plurality of the support portions 59 are configured of the support portions 59, for example, four legs extending generally vertically from corners of the movable contact board 58 so as to straddle the stationary contact points 19 and bending portions 62 provided in the four respective legs 59 to penetrate through the pair of the guide grooves 63 for supporting the stationary contact board 15 from the backside. Each bending portion 62 is formed by bending a tip of the each leg (support portion) 59 generally vertically.

[Explanation for an Operation of an Inhibitor Switch for an Automatic Transmission]

According to the inhibitor switch 11 as arranged above, when the manual shaft 13 and the detent plate 17 rotate by a gear shift operation of a user, a resilient contact position of the roller spring relative to the wave-shaped portion 39 in the detent plate 17 is changed. In consequence, the rotational position of the manual shaft 13 can be positioned at the changed resilient position and the gear shift position of the automatic transmission can be also positioned.

When a user operates a shift lever to perform a gear shift operation, the detent plate 17 is driven in association with the gear shift operation and the detent plate 17, the movable contact board 58 and the manual shaft 13 rotate integrally. The bending portion 62 provided in the support portion (leg portion) 59 of the movable contact board 58 suspends the stationary contact board 15 while sliding on the backside of the stationary contact board 15. In consequence, a manual valve is operated, making it possible to perform a gear shift for the automatic transmission.

When the operation of the shift lever is completed and each rotation of the manual shaft 13 and the detent plate 17 is stopped, a rotational position of the manual shaft 13 is detected based upon a change of an electrical connection pattern in accordance with a sliding position of the movable contact point 67 to the stationary contact point 19. Thereby, a gear shift position of the automatic transmission can be detected.

Advantage of Embodiment

In the conventional inhibitor switch, the metallic detent plate and the plastic stationary contact board are constructed to be as opposed to each other as having a common shaft of both thereof as a relative rotation center. Therefore, the stationary contact board requires formation of the shaft support portion and the component for supporting the stationary contact board is required. In consequence, there is a high demand for an improvement on the inhibitor switch in view of reduction in the number of components and reduction in the plastic amount.

On the other hand, in the inhibitor switch 11 for the automatic transmission according to the embodiment of the present invention, the movable contact board 58 is engaged to the detent plate 17 and the movable contact board 58 is provided with a plurality of support portions, for example, four legs 59 for supporting the stationary contact board 15 and, on the other hand, the stationary contact board 15 is provided with the plurality of the guide grooves 63 for reciprocally guiding the four support portions (legs) 59 in the movable contact board 58 along the rotational direction. Further, the plurality of the support portions 59 are configured of the support portions 59, for example, four legs extending generally vertically from base end faces of the movable contact board 58 so as to straddle the stationary contact points 19 and the bending portions 62 provided in the four respective legs 59 to penetrate through the pair of the guide grooves 63 for supporting the stationary contact board 15 from the backside. Thereby, the stationary contact board 15 is suspended through the respective support portions (leg) 59 in the movable contact board 58. As a result, formation of the shaft support portion to the stationary contact board 15 is not required and the component for supporting the stationary contact board 15 is not required, making it possible to acquire an inhibitor switch preferable in view of reduction in the number of components and reduction in a plastic amount.

In addition, in the inhibitor switch according to the embodiment of the present invention, each support portion (leg) 59 in the movable contact board 58 penetrates through the pair of the guide grooves 63 in the stationary contact board 15 to suspend the stationary contact board 15 from the backside thereof. Therefore, as a result, by appropriately designing an engagement relation between each support portion (leg) 59 and the pair of the guide grooves 63, it is possible to perform radial positioning of the movable contact board 58 to the stationary contact board 15 with high accuracy.

In the inhibitor switch 11 according to the embodiment of the present invention, a mechanical mutual function between the first and second regulation portions 41 and 43 integral with the detent plate 17, and the stationary contact board 15 in an assembled state serves to regulate the turning of the detent plate 17 to the stationary contact board 15 within the detection region of the electrical connection pattern between the stationary contact point 19 and the movable contact point 67. Therefore, this construction results in no need for regulation means such as another stopper, thus contributing to reduction in the number of components, as well as acquiring an advantage in costs.

Further, in the inhibitor switch 11 according to the embodiment of the present invention, the guide member 33 is attached through an engagement portion 29 in the outer periphery of the stationary contact board 15 to cover one side surface of the detent plate 17. Therefore, the guide member 33 can restrict an axial movement of the detent plate 17 to eliminate the axial looseness of the detent plate 17. In addition, since the metallic guide member 33 is adopted, as compared to a case of adopting a plastic guide member (conventional art), even if the inhibitor switch 11 according to the embodiment of the present invention is exposed to a high-temperature atmosphere, the guide member 33 does not nearly deform. Therefore, a high looseness-prevention effect can be realized. Further, the guide member 33 is configured by bending one metallic sheet of any appropriate shape to be in a C-letter shape and has one end easily attachable to the stationary contact board 15 in an insert way. In consequence, the attachment man-hour can be cut down. Further, since the guide member 33 has a folding side end an entire surface of which is covered with the plastic cover 37, a contact state between the guide member 33 and the detent plate 17 is a plastic-to-metal contact state. In consequence, as compared to a case of a contact state of metal-to-metal, defects such as occurrence of strange sounds or scratches by friction can be restricted beforehand.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

DESCRIPTION OF THE CODES

11: Inhibitor switch
13: Manual shaft
15: Stationary contact board
17: Detent plate
19: Stationary contact point
33: Guide member
41: First regulation member
43: Second regulation portion
45: Through bore (elongated bore and formed in a regulated dimension)
49: Cylindrical member (shaft)
58: Movable contact board
59: Plural support portions (leg)
61: Boss portion
62: Bending portion
63: A pair of guide grooves
67: Movable contact point

What is claimed is:

1. An inhibitor switch for an automatic transmission comprising:
   an insulative, plastic stationary contact board;
   a metallic detent plate rotating with a shaft depending on a select position of an automatic transmission, wherein the stationary contact board and the detent plate are arranged to be opposed to each other, and the stationary contact board is provided with metallic stationary contact points; and
   an insulative, plastic movable contact board engaged to the detent plate, wherein the movable contact board is provided with metallic movable contact points at positions facing the stationary contact points to slide on the stationary contact points, and by detecting a change of an electrical connection pattern in accordance with a sliding position of the movable contact point to the stationary contact point when the detent plate rotates with rotation of the shaft, a shift range position for the automatic transmission is detected, wherein:
   the movable contact board is provided with a plurality of support portions for supporting the stationary contact board; and
   the stationary contact board is provided with a plurality of guide grooves for reciprocally guiding the plurality of the support portions in the movable contact board along the rotational direction.

2. An inhibitor switch for an automatic transmission according to claim 1, wherein:
   the plurality of the support portions in the movable contact board includes a plurality of legs extending generally vertically from the movable contact board so as to straddle the stationary contact points and bending portions provided in the plurality of the respective legs to penetrate through the pair of the guide grooves for supporting the stationary contact board from the backside; and
   the stationary contact board is suspended by the plurality of the support portions in the movable contact board.

* * * * *